United States Patent [19]
Perry et al.

[11] 3,794,849
[45] Feb. 26, 1974

[54] POWER TRANSMISSION SYSTEM FOR CONNECTING FLOATING POWER PLANT TO STATIONARY CONDUCTORS

[75] Inventors: Elijah Robert Perry, Scottdale; Ralph W. Samm, Greensburg, both of Pa.

[73] Assignee: I-T-E Imperial Corporation, Philadelphia, Pa.

[22] Filed: Aug. 18, 1972

[21] Appl. No.: 281,718

[52] U.S. Cl. .................... 307/147, 60/1, 174/16 B, 174/28, 174/70 R, 174/101.5, 176/87
[51] Int. Cl. .............................................. H02g 3/00
[58] Field of Search ........ 307/147; 174/70 R, 101.5; 176/87

[56] References Cited
UNITED STATES PATENTS

| | | | |
|---|---|---|---|
| 3,017,934 | 1/1962 | Rhodes et al. ................... | 174/70 R |
| 3,546,356 | 12/1970 | Graybill ............................ | 174/21 C |
| 3,605,413 | 9/1971 | Morgan ............................ | 174/70 R |

*Primary Examiner*—J. V. Truhe
*Assistant Examiner*—William J. Smith
*Attorney, Agent, or Firm*—Ostrolenk, Faber, Gerb & Soffen

[57] ABSTRACT

A nuclear power plant is mounted on a floating barge stationarily moored within a sea wall, with the barge rising and falling with the tide. Underwater conductors fixed relative to the sea bed and extending from the shore to the barge are connected to the floating power plant by a freely suspended, horizontal transmission line section, which extends beneath the barge and is always completely submerged. This transmission line section is weighted to have neutral buoyancy, whereby the transmission line section flexes as a catenary as the barge rises and falls with the tide.

14 Claims, 7 Drawing Figures

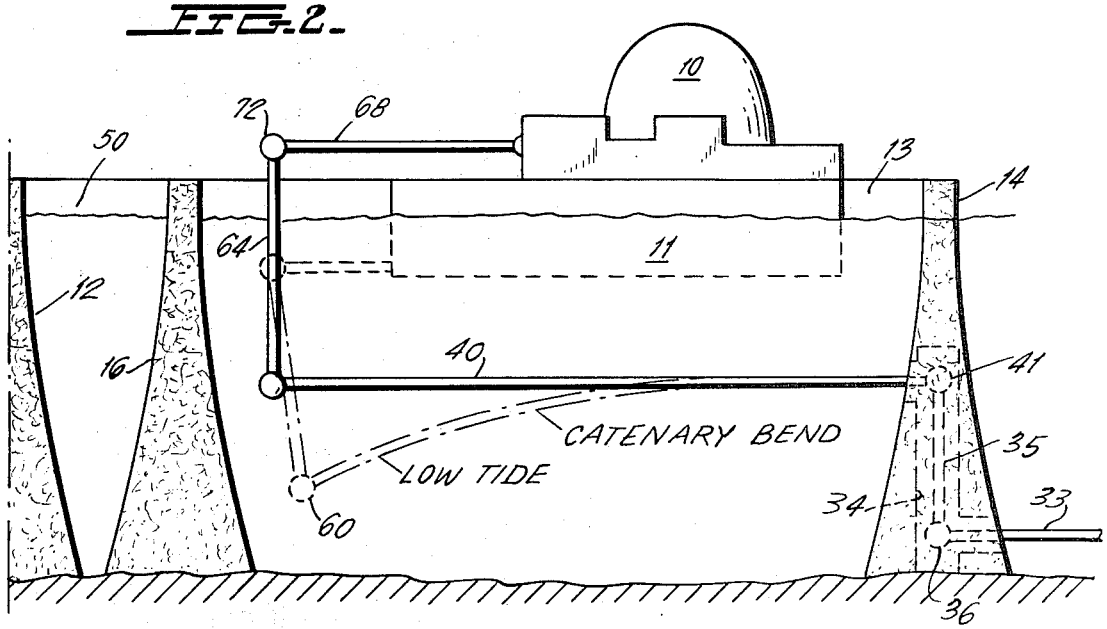
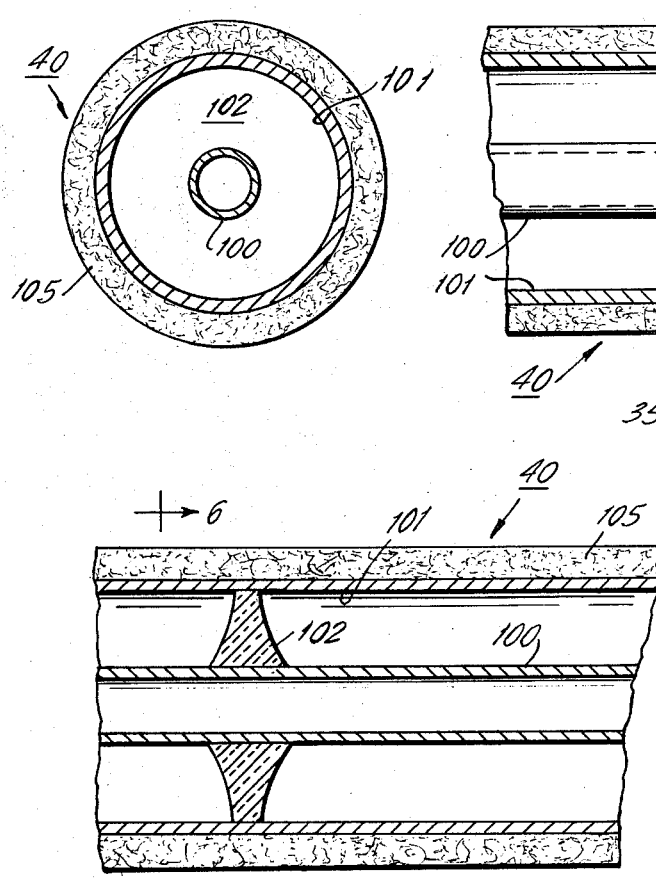
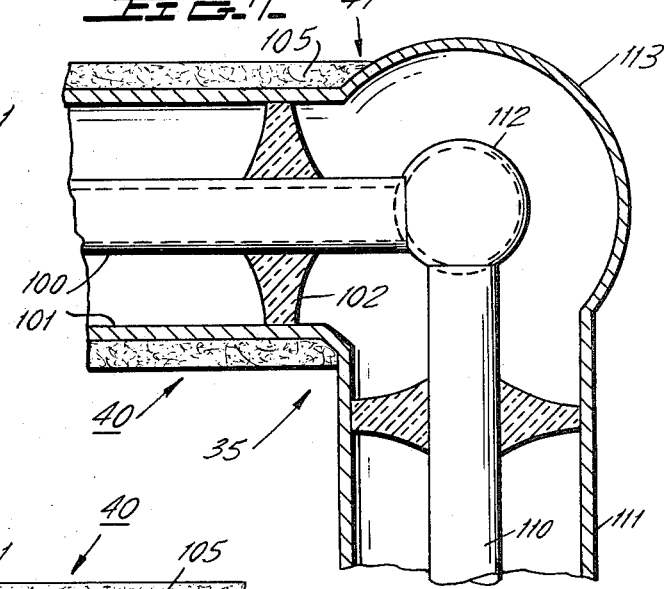

POWER TRANSMISSION SYSTEM FOR CONNECTING FLOATING POWER PLANT TO STATIONARY CONDUCTORS

BACKGROUND OF THE INVENTION

This invention relates to an electric power transmission system, and more specifically relates to a novel construction for a relatively rigid power transmission line section which connects a power source on a floating barge to underwater, and relatively stationary conductors which carry the power to shore facilities where the section can flex as the barge rises and falls.

Nuclear power plants may be mounted on floating barges in the open sea to avoid the objection of possible nuclear hazards in populated land areas.

In order to prevent lateral movement of the barges, they are confined within an enclosing sea wall which may be of poured concrete, or the like, which has a channel therethrough to permit water to flow in and out of the area enclosed by the sea wall, and to provide access to the floating barge by service vessels, and the like. The barge then floats within the sea wall and rises and falls as the tides change. Lateral movement of the barge within the sea wall is prevented by appropriate mooring techniques.

The rising and falling of the barge with the tides complicates the connection of the terminals of the electric power generators on the barge to the stationary transmission line which carries the power to shore. Thus, if the barge mounted generator station is in an area where the normal tides can be expected to be plus or minus 3 feet, a flexible current transfer device would have to operate through this excursion of 6 feet for about 30,000 cycles to have a useful life of about 40 years. Since there are some tides which are greater than the usual tide, it can also be expected, over the life of the system, that about 100 cycles of plus or minus 10 feet will be required to accommodate severe storm tides. The system should also be able to accommodate at least one very severe tide of plus 25 feet.

The use of sliding electrical contacts would be impractical to provide the current transfer between the floating barge and the stationary transmission system since these contacts would deteriorate quickly because of the high electrical power magnitude which must be transmitted in such systems, e.g., currents of from 1,000 to 4,000 amperes at voltages of from 115KV to 765 KV.

A conventional flexible conductor, which could accommodate this motion, is not satisfactory at the present time since such conductors will normally flex at some preferred pivotal point, so that the conductors could deteriorate after a few thousand flexures. Moreover, the nature of the conductor which can be selected for this purpose is limited by the extremely high voltages which are to be supported by the transmission line.

BRIEF SUMMARY OF THE INVENTION

In accordance with the present invention, a well known type of semi-rigid, gas filled, power transmission line is provided which has a main central conductor surrounded by an external, grounded housing. The housing diameter may be about 15 inches for a 345 KV system. The inner and outer conductors are insulated from one another by sulfur hexafluoride gas which fills the interior of the grounded housing.

In accordance with the invention, this type of transmission line is weighted along its length to have neutral buoyancy and is submerged alongside or beneath the floating power plant, with one end connected to the terminals of the power plant and its other end connected to the stationary portion of the system.

The neutral buoyancy conductor or transmission line section is then placed at a depth sufficient to keep it completely submerged at its fixed end, where it is connected to the relatively stationary conductors which connect the system to shore. Thus, the entire length of the section, including its fixed end will always be completely submerged even at the lowest possible tide.

It has been found that the neutral buoyancy weighting and total submergence of the transmission line section will always nullify the effects of gravity thereby causing the submerged transmission line section to flex in the form of a catenary. That is if the suspended transmission line section is sufficiently long, for example, 100 feet or more, as the barge rises and falls, the line would tend to pivot about the point where the transmission line section terminates on the stationary line. This would cause substantial stress, particularly in the relatively rigid housing structure described above. This stress however, will be substantially relieved by the present invention, with the stress being distributed over the full length of the catenary shape which is formed when the transmission line is caused to flex out of its normal straight line position.

The submerged flexible transmission line length which flexes as a catenary is then connected to the barge by a suitable vertical riser which is sufficiently long to absorb any limited lateral movement of the floating power plant within the sea wall. The vertical risers need not be weighted for neutral buoyancy since they do not encounter the substantial movement seen by the horizontal flexible system as the barge level changes with the tide.

BRIEF DESCRIPTION OF THE DRAWINGS

FIG. 2 is a vertical cross-section through FIG. 1 and illustrates the catenary bending of the submerged transmission line section which connects the barge power source to the fixed transmission line terminals.

FIG. 5 is a vertical cross-section of one of the gas-filled transmission lines of FIGS. 1 to 4, and illustrates the manner in which the central conductor is supported within an outer grounded housing, with a concrete sheath on the outer housing having sufficient thickness to cause the conductor to have neutral buoyancy.

FIG. 6 is a cross-sectional view of FIG. 5 taken across the section line 6—6 in FIG. 5.

FIG. 7 is a cross-sectional view of one of the transmission line conductors at one of the elbows.

DETAILED DESCRIPTION OF THE DRAWINGS

Figure 1:
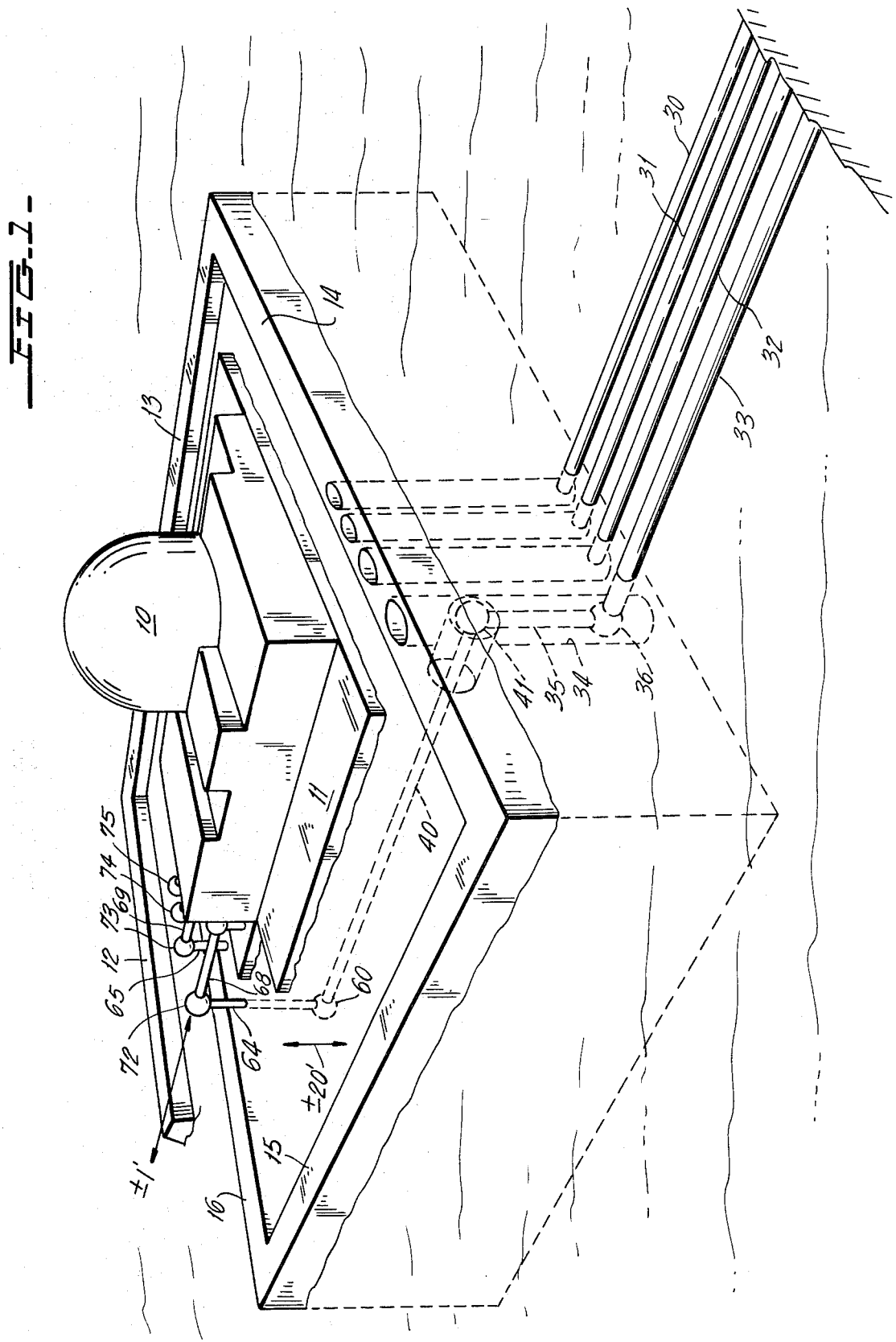
FIG. 1 is a perspective diagram of a floating power plant confined within a sea wall and having a transmission line section for transmitting power from the barge to a stationary transmission line in accordance with the invention.

Referring first to FIGS. 1 to 4, there is illustrated therein a nuclear power plant 10 carried on a barge 11. The barge 11 then floats off shore and is contained within a poured concrete sea wall formed of enclosing walls 12, 13, 14, 15 and 16. Note that walls 12 and 16 are spaced to form a channel through which supply vessels may pass, and through which sea water may enter and exit so that the water level within the sea wall is the same as the water level outside of the sea wall.

The barge 11 is then suitably permanently moored against excessive lateral motion within the sea wall by conventional mooring techniques. By way of example, the barge 11 may be permitted to have a lateral movement in any direction of up to about 1 foot. The barge 11, however, will be free to rise and fall with the tide which may normally have a daily excursion of about 6 feet. Moreover, the barge may be expected to undergo relatively large changes in position about twice a year of about plus or minus 10 feet due to severe storm tides and should be capable of rising about 20 feet under an exceptional circumstance which might occur only once in the life of the station.

In order to bring electrical power from the generating station 10 to shore, a plurality of stationary high-voltage gas-insulation power transmission lines, such as lines 30, 31, 32 and 33, are relatively stationarily fixed with respect to the ocean bed and extend from the shore line to the sea wall. The sea wall section 14 is further provided with hollow channels, such as hollow channel 34, shown in FIG. 1, through which vertical risers, such as vertical riser 35 in channel 34 rise upwardly. Note that the vertical risers, such as vertical riser 35, are connected to the end of transmission line 33 by a suitable spherical transition connection 36 which will be described more fully hereinafter. Note further that stationary conductors 30 to 33 and their respective risers, such as riser 35, can be of any desired construction suitable to conduct the output voltages and currents produced by the power station to shore.

It is to be noted that there are provided four parallel conductor systems. Three of the conductor systems will commonly be used as the three conductors of three-phase output power generated by the nuclear station. The fourth conductor system serves as a spare which can replace any one of the other phases during repair or maintenance procedures.

The invention relates to the manner in which the power station output terminals which rise and fall with the tide, and which rock with the rocking of barge 11 are connected to the risers, such as riser 35, which are stationary regardless of tide level.

Figure 3:
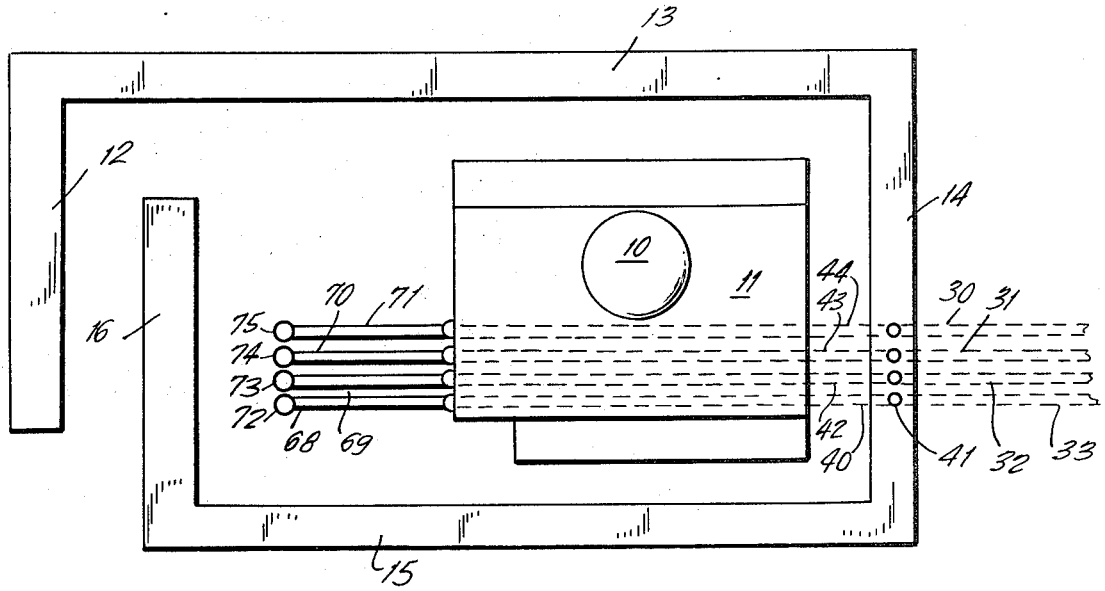
FIG. 3 is a top plan view of FIG. 1.
Figure 4:
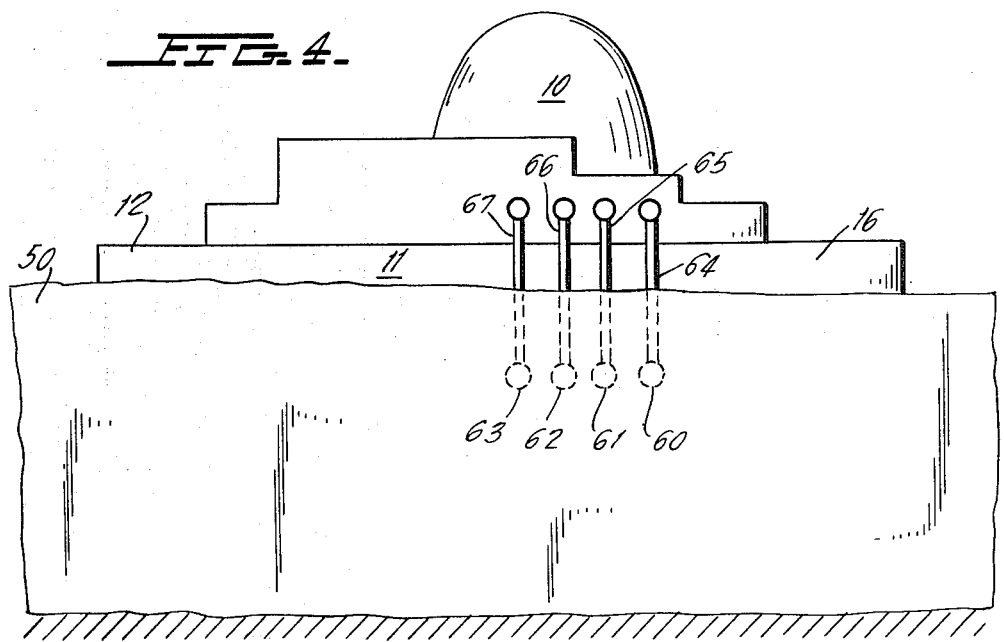
FIG. 4 is a rear view of FIG. 1 and shows all vertical risers emerging from the water surface.

In accordance with the invention, horizontal transmission line sections, such as line section 40 (FIGS. 1 and 2) are disposed beneath barge 11 at a depth such that the spherical termination 41 where the conductor 40 engages riser 35 (and similarly the points at which the other horizontal conductors 42, 43 and 44 of FIG. 3 engage their respective vertical risers) is always beneath the lowest possible tide level of water surface 50. Placing conductors 40, 42, 43 and 44 beneath the barge 11 conserves space and allows a reduction in the area needed to be enclosed by the sea wall. However, the conductors 40, 42, 43 and 44 could also be submerged alongside barge 11. Horizontal sections 40, 42, 43 and 44 are then constructed to have a neutral buoyancy so that they will bend in the fashion of a catenary, as shown in dotted lines in FIG. 2. Sections 40, 42, 43 and 44 are typically 100 feet, or more, long so that catenary bending stresses distributed over the length of the conductor will not be excessive. Thus, relatively small stresses exist at the elbow 41 which otherwise could be fractured by stresses due to a pivotal flexing of conductors 40, 42, 43 and 44.

The ends of conductors 40, 42, 43 and 44 are then connected, by elbow connections 60, 61, 62 and 63, respectively, to vertical risers 64 to 67, respectively. Risers 64 to 67 are, in turn, connected to reentrantly directed horizontal sections 68, 69, 70 and 71, respectively, through the spherical elbows 72 to 75, respectively. The other end of horizontal sections 68 to 71 is then connected to the terminals of the power station.

As pointed out previously, and in accordance with the invention, each of the power transmission line conductors, and particularly sections 40, 42, 43 and 44 should have neutral buoyancy so that they will bend in the fashion of a catenary.

FIGS. 5 and 6 illustrate a typical construction for section 40 where the section consists of a central tubular conductor 100 which is enclosed by an outer conductor housing 101. Members 100 and 101 are concentrically supported and insulated from one another by longitudinally spaced insulation disks, one of which is shown as the insulation disk 102. The space between conductor 100 and sheath 101 is then filled with an electronegative gas such as sulfur hexafluoride gas and mixtures thereof at some suitable pressure, for example, 4 atmospheres, to provide the necessary dielectric integrity for the transmission line. Where the transmission line voltage is to be 345KV, the outer diameter of housing 101 may be about 15 inches.

In order for the transmission line sections 40, 42, 43 and 44 to have neutral buoyancy, it is necessary to add weight to these conductors. Thus, in the embodiment of FIGS. 5 and 6, the outer conductive housing 101 is shown to have a concrete sheath 105 thereon, which extends for the full length of the section 40 and adds sufficient weight to the total section 40, so that the volume of water which the section 40 displaces equals the section's weight. It is to be noted that the entire transmission line from the nuclear generator station to shore may consist of a power line identical in construction to that shown in FIGS. 5 and 6 except that the concrete sheath for neutral buoyancy is not needed on conductor lengths in the system other than sections 40, 42, 43 and 44.

The various elbow connections, in which perpendicular conductors are connected together may be made as shown in U.S. Pat. No. 3,546,356, in the name of Graybill et al., where the inner and outer conductors at the joint are spherically formed.

One typical joint constructed in this manner is shown in FIG. 7 for the case of elbow joint 41. Thus, the joint 41 connects the fixed end of section 40 to the upper fixed end of riser 35. Note that riser 35, like section 40, consists of a gas-insulated central conductor 110 supported relative to the outer housing 111. Central conductor 110 is then connected to the conductor 100 by a spherical conductor 112 which is welded between members 100 and 110. Similarly, the outer housings 101 and 111 are connected together by a spherical housing section 113. Note that the concrete sheath 105 is not necessary on the housing section 111.

In a typical application of the invention, and as was pointed out previously, conductors 40, 42, 43 and 44 will have a length of about 100 feet; risers 64 to 67 will have a length of about 40 feet; and reentrantly extending horizontal conductors 68 to 71 will also have a length of about 40 feet.

In operation and as the barge 11 rocks, due to wind and rises and falls, due to tides, substantially all of the motion of the barge is transmitted to the horizontal submerged conductors 40, 42, 43 and 44, with these conductors bending in a smooth catenary shape which tends to distribute stress along the full length of the conductors. Thus, the bending stress, at the connection elbow 41 to the stationary system (for conductor 40) is substantially relieved and the stress is distributed over the length of the catenary. Note that very little force is vertically transmitted to the upper horizontal sections 68 to 71 from the ends of horizontal sections, 40, 42, 43 and 44, respectively.

Since the barge 11 will have some limited lateral movement, for example, about 1 foot in any direction, the vertical risers 64 to 67 are made sufficiently long (40 feet) that this relatively small deflection in the plane of sections 40, 64 and 68 can be absorbed without excessive mechanical stress on the joints involved. Note that small deflections perpendicular to the above plane are easily absorbed by the flexing of conductors 40, 42, 43 and 44.

Although the present invention has been described in connection with a preferred embodiment thereof, many variations and modifications will now become apparent to those skilled in the art. It is preferred, therefore, that the present invention be limited not by the specific disclosure herein, but only by the appended claims.

The embodiments of the invention in which an exclusive privilege or property is claimed are defined as follows:

1. A flexible power transmission line for transmitting power from a floating barge containing a power generating station to a submerged, relatively stationary transmission line which extends to a shore installation; one end of said flexible power line being electrically connected to terminals of said power generating station; said one end being vertically movable with the rise and fall of the tide of the body of water receiving the floating barge; a second end of said power transmission line being stationarily fixed relative to said first end and being connected to said submerged, relatively stationary transmission line; said flexible transmission line being at least generally horizontally disposed and having a length of at least about 100 feet and having a volume which displaces a given volume of water; said flexible transmission line having a weight which is evenly distributed along the length thereof and which is about equal to the weight of said displaced volume of water, whereby said flexible transmission line bends in the form of a catenary as said one end is moved vertically due to vertical movement of said barge.

2. The flexible transmission line of claim 1 wherein said line comprises an elongated central conductor and a watertight outer conductive housing concentric with said central conductor and insulated therefrom, and a gaseous dielectric under positive pressure filling the space between said central conductor and said outer housing; the weights of said central conductor and outer housing being less than the volume of water which is displaced by said outer housing; and auxiliary weight means connected to said line to increase the weight thereof to the said weight of water displaced by said outer housing.

3. The flexible transmission line of claim 1 wherein said second end of said transmission line is at a water depth which is always submerged, regardless of at least ordinary tidal conditions.

4. The flexible transmission line of claim 1 which further includes a vertically rising transmission line section connected at its bottom end to said one end and a horizontal transmission line section fixed above water level and having one end connected to the top of said vertically rising section and its other end connected to terminals of said power generating station.

5. A power generating and transmitting system comprising, in combination: a floating barge containing thereon an electric power generating station, a relatively stationary submerged power transmission line section extending from a shore installation to a region adjacent said barge, a relatively flexible horizontal power transmission line section, having a first end connected to said relatively stationary submerged power transmission line and a second end connected to said electric power generating station; said flexible transmission line section being fully submerged, regardless of the tide condition which raises and lowers the water surface level relative to said second end; said flexible transmission line section having a length of at least about 100 feet and having a volume which displaces a given volume of water; said flexible transmission line having a weight which is evenly distributed along the length thereof and which is about equal to the weight of said displaced volume of water, whereby said flexible transmission line bends in the form of a catenary as said one end is moved vertically due to vertical movement of said barge.

6. The combination of claim 1 wherein said flexible transmission line section is submerged below the bottom of said barge.

7. The combination of claim 1 which further includes a sea wall surrounding said barge and means for mooring said barge against lateral movement within said sea wall; said relatively stationary transmission line section extending through said sea wall and being connected to said flexible transmission line at a region adjacent said sea wall.

8. The combination of claim 1 which further includes a vertically rising transmission line section connected at its bottom end to said one end and a horizontal transmission line section fixed above water level and having one end connected to the top of said vertically rising section and its other end connected to terminals of said power generating station.

9. The combination of claim 1 wherein said flexible line comprises an elongated central conductor and a watertight outer conductive housing concentric with said central conductor and insulated therefrom, and a gaseous dielectric under positive pressure filling the space between said central conductor and said outer housing; the weights of said central conductor and outer housing being less than the volume of water which is displaced by said outer housing; and auxiliary weight means connected to said line to increase the weight thereof to the said weight of water displaced by said outer housing.

10. The flexible transmission line of claim 2 wherein said auxiliary weight means includes a concrete sheath on said outer housing.

11. The flexible transmission line of claim 9 wherein said auxiliary weight means includes a concrete sheath on said outer housing.

12. The combination of claim 11 wherein said flexible transmission line section is submerged below the bottom of said barge.

13. A neutral buoyancy high voltage, high power transmission line for underwater installation, wherein said line can flex as a catenary in response to cantilever stress; said line comprising an elongated central conductor and a watertight outer conductive housing concentric with said central conductor and insulated therefrom, and a gaseous dielectric under positive pressure filling the space between said central conductor and said outer housing; the weights of said central conductor and outer housing being less than the volume of water which is displaced by said outer housing; and auxiliary weight means connected to said line to increase the weight thereof to the said weight of water displaced by said outer housing.

14. The transmission line of claim 13 wherein said auxiliary weight means comprises a concrete-like sheath on said outer housing.

* * * * *